United States Patent [19]

Siefert et al.

[11] Patent Number: 4,471,070

[45] Date of Patent: Sep. 11, 1984

[54] PREPARATIVE PROCESS FOR ALKALINE EARTH METAL, ALUMINUM-CONTAINING SPINELS

[75] Inventors: Kristine S. Siefert, Dolton; Jin S. Yoo, Flossmoor; Emmett H. Burk, Jr., Glenwood, all of Ill.

[73] Assignee: Atlantic Richfield Company, Philadelphia, Pa.

[21] Appl. No.: 445,130

[22] Filed: Nov. 29, 1982

[51] Int. Cl.$^3$ .................. B01J 21/04; B01J 23/02; B01J 23/10
[52] U.S. Cl. ................... 502/302; 502/306; 502/324; 502/328; 502/341; 502/439; 502/524; 423/600
[58] Field of Search .............. 252/463; 423/600; 502/302, 306, 324, 328, 341, 439, 524

[56] References Cited

U.S. PATENT DOCUMENTS 2,992,191 7/1961 Erickson .................. 252/465 X
3,791,992 2/1974 Feldwick ..................... 252/463

Primary Examiner—W. J. Shine
Attorney, Agent, or Firm—Frank J. Uxa

[57] ABSTRACT

An improved process for the production of alkaline earth, aluminum-containing spinel compositions, preferably magnesium, aluminum-containing spinel compositions and preferably further comprising at least one additional metal component, comprises adding a basic aqueous solution containing at least one aluminum component to an aqueous solution containing at least one alkaline earth metal component to form a precipitate at defined pH conditions and calcining the precipitate to form a spinel composition. The product spinel composition, preferably with included additional metal components, is particularly suited for use to reduce the amount of sulfur oxides emitted from a catalyst regeneration zone, e.g., a catalytic cracking unit regeneration zone.

20 Claims, No Drawings

PREPARATIVE PROCESS FOR ALKALINE EARTH METAL, ALUMINUM-CONTAINING SPINELS

BACKGROUND OF THE INVENTION

This invention relates to the improved preparation of alkaline earth metal, aluminum-containing spinel compositions, particularly for use in the combusting of solid, sulfur-containing material in a manner to effect a reduction in the emission of sulfur oxides to the atmosphere. In one specific embodiment, the invention involves the catalytic cracking of sulfur-containing hydrocarbon feedstocks in a manner to effect a reduction in the amount of sulfur oxides emitted from the regeneration zone of a hydrocarbon catalytic cracking unit.

Typically, catalytic cracking of hydrocarbons takes place in a reaction zone at hydrocarbon cracking conditions to produce at least one hydrocarbon product and to cause carbonaceous material (coke) to be deposited on the catalyst. Additionally, some sulfur, originally present in the feed hydrocarbons, may also be deposited, e.g., as a component of the coke, on the catalyst. It has been reported that approximately 50% of the feed sulfur is converted to $H_2S$ in the FCC reactor, 40% remains in the liquid products and about 4 to 10% is deposited on the catalyst. These amounts vary with the type of feed, rate of hydrocarbon recycle, steam stripping rate, the type of catalyst, reactor temperature, etc.

Sulfur-containing coke deposits tend to deactivate cracking catalyst. Cracking catalyst is advantageously continuously regenerated, by combustion with oxygen-containing gas in a regeneration zone, to low coke levels, typically below about 0.4% by weight, to perform satisfactorily when it is recycled to the reactor. In the regeneration zone, at least a portion of sulfur, along with carbon and hydrogen, which is deposited on the catalyst, is oxidized and leaves in the form of sulfur oxides ($SO_2$ and $SO_3$, hereinafter referred to as "$SO_x$") along with substantial amounts of $CO$, $CO_2$ and $H_2O$.

Considerable recent research effort has been directed to the reduction of sulfur oxide emissions from the regeneration zones of hydrocarbon catalytic cracking units. One technique involved circulating one or more metal oxides capable of associating with oxides of sulfur with the cracking catalyst inventory in the regeneration zone. When the particles containing associated oxides of sulfur are circulated to the reducing atmosphere of the cracking zone, the associated sulfur compounds are released as gaseous sulfur-bearing material such as hydrogen sulfide which is discharged with the products from the cracking zone and are in a form which can be readily handled in a typical facility, e.g., petroleum refinery. The metal reactant is regenerated to an active form, and is capable of further associating with the sulfur oxides when cycled to the regeneration zone.

Incorporation of Group II metal oxides on particles of cracking catalyst in such a process has been proposed (U.S. Pat. No. 3,835,031 to Bertolacini). In a related process described in U.S. Pat. No. 4,071,436 to Blanton, et al., discrete fluidizable alumina-containing particles are circulated through the cracking and regenerator zones along with physically separate particles of the active zeolitic cracking catalyst. The alumina particles pick up oxides of sulfur in the regenerator, forming at least one solid compound, including both sulfur and aluminum atoms. The sulfur atoms are released as volatiles, including hydrogen sulfide, in the cracking unit.

U.S. Pat. No. 4,071,436 further discloses that 0.1 to 10 weight percent $MgO$ and/or 0.1 to 5 weight percent $Cr_2O_3$ are preferably present in the alumina-containing particles. Chromium is used to promote coke burnoff.

A metallic component, either incorporated into catalyst particles or present on any of a variety of "inert" supports, is exposed alternately to the oxidizing atmosphere of the regeneration zone of an FCCU and the reducing atmosphere of the cracking zone to reduce sulfur oxide emissions from regenerator gases in accordance with the teachings of U.S. Pat. Nos. 4,153,534 and 4,153,535 to Vasalos and Vasalos, et al., respectively. In Vasalos, et al., a metallic oxidation promoter such as platinum is also present when carbon monoxide emissions are to be reduced. These patents disclose nineteen different metallic components, including materials as diverse as alkaline earths, sodium, heavy metals and rare earth, as being suitable reactants for reducing emissions of oxides of sulfur. The metallic reactants that are especially preferred are sodium, magnesium, manganese and copper. When used as the carrier for the metallic reactant, the supports that are used preferably have a surface area at least 50 square meters per gram. Examples of allegedly "inert" supports are silica, alumina and silica-alumina. The Vasalos and Vasalos, et al., patents further disclose that when certain metallic reactants (exemplified by oxides of iron, manganese or cerium) are employed to capture oxides of sulfur, such metallic components can be in the form of a finely divided fluidizable powder.

Similarly, a vast number of sorbents have been proposed for desulfurization of non-FCCU flue gases in zones outside the unit in which $SO_x$ is generated. In some such non-FCCU applications, the sorbents are regenerated in environments appreciably richer in hydrogen than the cracking zone of an FCC unit. Cerium oxide is one of fifteen adsorbents disclosed for flue gas desulfurization in a publication of Lowell, et al., "SELECTION OF METAL OXIDES FOR REMOVING $SO_x$ FROM FLUE GAS," Ind. Eng. Chemical Process Design Development, Vol. 10, Nov. 3, 1971. In U.S. Pat. No. 4,001,375 to Longo, cerium on an alumina support is used to absorb $SO_2$ from non-FCCU flue gas streams or automobile exhaust at temperatures of 572° to 1472° F., preferably 932° to 1100° F. The sorbent is then regenerated in a separate unit by contacting it with hydrogen mixed with steam at 932° to 1472° F. During regeneration the desorbed species is initially $SO_2$ and $H_2S$ along with excess reducing gases which can be used as feedstock for a Claus unit. The Longo patent is not concerned with reducing emissions from an FCC unit and the reducing atmosphere employed in practice of this process differs significantly from the hydrocarbon-rich atmosphere in a catalytic cracker. Thus a hydrocarbon cracking reaction zone is preferably operated in the substantial absence of added hydrogen while the presence of sweeping amounts of hydrogen gas is essential to the regeneration step in practice of the process of Longo.

D. W. Deberry, et al., "RATES OF REACTION OF $SO_2$ WITH METAL OXIDES," Canadian Journal of Chemical Engineering, 49, 781 (1971) reports that cerium oxide was found to form sulfates more rapidly than most of the other oxides tested. The temperatures used, however, were below 900° F. and thus below those preferred for use in catalyst regeneration in FCC units.

Many commercial zeolitic FCC catalyst contain up to 4% rare earth oxide, the rare earth being used to stabilize the zeolite and provide increased activity. See, for example, U.S. Pat. No. 3,930,987 to Grand. The rare earths are most often used as mixtures of $La_2O_3$, $CeO_2$, $Pr_2O_{11}$, $Nd_2O_3$ and others. Some catalyst is produced by using a lanthanum-rich mixture obtained by removing substantial cerium from the mixture of rare earth. It has been found that the mere presence of rare earth in a zeolitic cracking catalyst will not necessarily reduce SOx emissions to an appreciable extent.

In accordance with the teachings of U.S. Pat. No. 3,823,092 to Gladrow, certain zeolitic catalyst compositions capable of being regenerated at a rate appreciably faster than prior art rare earth exchanged zeolitic catalyst compositions are produced by treating a previously rare earth exchanged zeolitic catalyst composition with a dilute solution containing cerium cations (or a mixture of rare earths rich in cerium). The final catalysts contain 0.5 to 4% cerium cations which are introduced to previously rare earth exchanged zeolitic catalyst particles prior to final filtering, rinsing and calcining. Cerium is described as an "oxidation promoter". There is not recognition or appreciation in the patent of the effect of the cerium impregnation on SOx stack emissions. Such impregnation of rare earth exchanged zeolitic catalyst particles is not always effective in producing modified catalysts having significant ability to bind oxides of sulfur in a FCC regenerator and release them in a FCC cracking reaction zone.

Thus, considerable amount of study and research effort has been directed to reducing oxide of sulfur emissions from various gaseous streams, including those from the stacks of the regenerators of FCC units. However, the results leave much to be desired. Many metallic compounds have been proposed as materials to pick up oxides of sulfur in FCC units (and other desulfurization applications) and a variety of supports, including particles of cracking catalysts and "inerts", have been suggested as carriers for active metallic reactants. Many of the proposed metallic reactants lose effectiveness when subjected to repeated cycling. Thus, when Group II metal oxides are impregnated on FCC catalysts or various supports, the activity of the Group II metals is rapidly reduced under the influence of the cyclic conditions. Discrete alumina particles, when combined with silica-containing catalyst particles and subjected to steam at elevated temperatures, e.g., those present in FCC unit regenerators, are of limited effectiveness in reducing SOx emissions. Incorporation of sufficient chromium on an alumina support to improve SOx sorption results in undesirably increased coke and gas production.

Commonly assigned U.S. patent applications, namely, U.S. application Ser. No. 301,678, filed Sept. 14, 1981, now abandoned, and U.S. application Ser. No. 301,676, filed Sept. 14, 1981, now abandoned, relate to improved materials for reducing SOx emissions, incorporating, respectively, spinel compositions, preferably alkaline earth metal-containing spinels, and spinel compositions including at least one additional metal component. The specification of each of these patent applications is incorporated herein by reference.

Various methods have been described for the preparation of alkaline earth aluminate spinels, and particularly of magnesium aluminate spinels. According to the method disclosed in U.S. Pat. No. 2,992,191, the spinel can be formed by reacting, in an aqueous medium, a water-soluble magnesium inorganic salt and a water-soluble aluminum salt in which the aluminum is present in the anion. This patent does not teach controlling pH during the time the two salts are combined.

Another process for producing magnesium aluminate spinel is set forth in U.S. Pat. No. 3,791,992. This process includes adding a highly basic solution of an alkali metal aluminate to a solution of a soluble salt of magnesium with no control of pH during the addition; separating and washing the resulting precipitate; exchanging the washed precipitate with a solution of an ammonium compound to decrease the alkali metal content; followed by washing, drying, forming and calcination steps.

There remains a need for improved spinel catalyst components, exhibiting good SOx removal properties, and for improved processing in their manufacture.

SUMMARY OF THE INVENTION

This invention relates to a novel process for the improved production of alkaline earth metal and aluminum-containing spinel compositions. Such spinels find particular use in diminishing the emissions of sulfur oxides from combustion zones, and more particularly in conjunction with catalytic compositions employed in hydrocarbon cracking processes.

The process of this invention further provides for the association of one or more additional metal components with the alkaline earth metal, aluminum-containing spinel composition.

Other objects and advantages of this invention will be apparent from the following detailed description.

DESCRIPTION OF THE INVENTION

This invention broadly relates to a novel process for the production of alkaline earth metal, alumimum-containing spinel compositions comprising:

(a) adding (a) a basic aqueous solution containing at least one aluminum component in which the aluminum is present as an anion to an aqueous solution containing at least one alkaline earth metal component and forming an alkaline earth metal, aluminum-containing precipitate, provided that the pH of the liquid phase present with the precipitate at the time the addition is concluded is in the range of about 8.5 to about 10.5; and (b) calcining said precipitate to form the alkaline earth metal, aluminum-containing spinel composition.

The process of the present invention provides outstanding benefits. For example, such process provides improved yields of spinel materials having improved uniformity of composition. Thus, the present invention provides for more complete utilization of the alkaline earth metal and aluminum components in the aqueous solutions. This feature allows one to predetermine, with improved accuracy, the actual composition of the spinel material to be produced. In addition, the composition of these spinel materials is more uniform. In one preferred embodiment, these spinel materials comprise a single phase or solid solution, which has been found to provide improved results in sulfur oxide reduction service relative to, for example, a two phase system of free magnesia or free alumina and spinel.

In a preferred embodiment, the pH of the liquid phase present with the precipitate at the time the addition noted above is concluded is in the range of about 9 to about 10.

The presently prepared spinel compositions may be used, for example, in the form of particles of any suitable shape and size. Such particles may be formed by conventional techniques, such as spray drying, pilling, tabletting, extrusion, bead formation (e.g., conventional oil drop method) and the like. When spinel-containing particles are to be used in a fluid catalytic cracking unit, it is preferred that a major amount by weight of the spinel-containing particles have diameters in the range of about 10 microns to about 250 microns, more preferably about 20 microns to about 125 microns.

This invention further relates to the production of an alkaline earth metal and aluminum-containing spinel composition which also includes at least one additional metal component in an amount effective to promote the oxidation of $SO_2$ to $SO_3$ at $SO_2$ oxidation conditions. In one preferred embodiment, the additional metal component may be added to the alkaline earth metal, aluminum-containing precipitate or spinel composition using techniques, such as impregnation, which are conventional and well known in the art.

The spinel structure is based on a cubic close-packed array of oxide ions. Typically, the crystallo-graphic unit cell of the spinel structure contains 32 oxygen atoms. With regard to magnesium aluminate spinel, there often are eight Mg atoms and sixteen Al atoms to place in a unit cell ($8MgAl_2O_4$). Other alkaline earth metal ions, such as calcium, strontium, barium and mixtures thereof, may replace all or a part of the magnesium ions. Other trivalent metal ions, such as iron, chromium, gallium, boron, cobalt and mixtures thereof, may replace a portion of the aluminum ions.

The presently useful alkaline earth metal and aluminum containing spinels include a first metal (alkaline earth metal) and aluminum as the second metal having a valence higher than the valence of the first metal. The atomic ratio of the first metal to the second metal in any given alkaline earth metal and aluminum containing spinel need not be consistent with the classical stoichiometric formula for such spinel. In one embodiment, the atomic ratio of the alkaline earth metal to aluminum in the spinels of the present invention is at least about 0.17 and preferably at least about 0.25. It is preferred that the atomic ratio of alkaline earth metal to aluminum in the spinel be in the range of about 0.17 to about 1, more preferably about 0.25 to about 0.75, and still more preferably about 0.35 to about 0.65.

The preferred spinel composition of the present invention is magnesium and aluminum-containing spinel composition.

The alkaline earth metal components useful in the present invention include those which are suitable to provide the above-noted spinel compositions. It is preferred that the alkaline earth metal component or components employed be substantially soluble in water. Examples of suitable alkaline earth metal component include nitrates, sulfates, formates, acetates, acetylacetonates, phosphates, halides, carbonates, sulfonates, oxalates, and the like. The alkaline earth metals include beryllium, magnesium, calcium, strontium, and barium. The preferred alkaline earth metal components for use in the present invention are those comprising magnesium.

As noted above, the aluminum components present in the basic solution useful in the present invention are those in which the aluminum is present as an anion. Preferably, the aluminum salt is present as an aluminate salt, more preferably as an alkali metal aluminate.

In another preferred embodiment, the aqueous solution containing at least one alkaline earth metal component includes at least one added acidic material. Any suitable acid or combination of acids may be employed in the presently useful alkaline earth metal component-containing aqueous solutions. Examples of such acids include nitric acid, sulfuric acid, hydrochloric acid, acetic acid and mixtures thereof, with nitric acid, sulfuric acid and mixtures thereof being preferred. Any suitable basic material or combination of such materials may be employed in the presently useful basic aqueous solutions. Examples of such basic material include alkali metal hydroxides, ammonium hydroxide and mixtures thereof, with alkali metal hydroxides, and in particular sodium hydroxide, being preferred for use.

In certain embodiments of this invention, particulate material comprising the alkaline earth metal and aluminum-containing spinel composition also contains at least one additional metal component. These additional metal components are defined as being capable of promoting the oxidation of sulfur dioxide to sulfur trioxide at combustion conditions, e.g., the conditions present in a hydrocarbon catalytic cracking unit regenerator. Increased carbon monoxide oxidation may also be obtained by including the additional metal components. Such additional metal components are selected from the group consisting of Group IB, IIB, IVB, VIA, VIB, VIIA and VIII of the Periodic Table, the rare earth metals, vanadium, iron, tin and antimony and mixtures thereof and may be incorporated into the presently useful spinel compositions by one or more embodiments of the process of this invention. The preferred additional metal component for use is selected from the group consisting of bismuth, rare earth metals, antimony, chromium, copper, iron, manganese, vanadium, tin and mixtures thereof.

Generally, the amount of the additional metal component or components present in the final product is small compared to the quantity of the spinel. Preferably, the final product comprises a minor amount by weight of at least one additional metal component, more preferably up to about 20% by weight (calculated as elemental metal). Of course, the amount of additional metal used will depend, for example, on the degree of sulfur dioxide oxidation desired and the effectiveness of the additional metal component to promote such oxidation. When, as is more preferred, the additional metal component is rare earth metal component (still more preferably cerium component), the preferred amount of this additional metal component is within the range of about 1 to about 20 wt. %, more preferably about 5 to about 20 wt. % (calculated as the rare earth metal oxide) of the total final product.

The additional metal component may exist in the final product at least in part as a compound such as an oxide, sulfide, halide and the like, or in the elemental state.

The precipitate, which is preferably dried, is calcined to yield the alkaline earth metal, aluminum-containing spinel composition. Drying and calcination may take place simultaneously. However, it is preferred that the drying take place at a temperature below that which water of hydration is removed from the spinel precursor, i.e., precipitate. Thus, this drying may occur in flowing air at temperatures below about 500° F., preferably in the range of about 150° F. to about 450° F., more preferably about 230° F. to about 450° F. Alternatively, the precipitate can be spray dried.

The drying of the precipitate can be accomplished in various manners, for example, by spray drying, drum drying, flash drying, tunnel drying and the like. The drying temperature or temperatures is selected to remove at least a portion of the liquid phase. Drying times are not critical to the present invention and may be selected over a relatively wide range sufficient to provide the desired dried product. Drying times in the range of about 0.2 hours to about 24 hours or more may be advantageously employed.

Spray drying equipment which is conventionally used to produce catalyst particles suitable for use in fluidized bed reactors may be utilized in the practice of the present invention. For example, this equipment may involve at least one restriction or high pressure nozzle having a diameter in the range from about 0.01 in. to about 0.2 in., preferably from about 0.013 in. to about 0.15 in. The pressure upstream of this high pressure nozzle may range from about 400 psig. to about 10,000 psig., preferably from about 400 psig. to about 7,000 psig. The material to be dried is sent through the nozzle system into a space or chamber. The pressure in the space or chamber downstream from the nozzle system is lower than that immediately upstream of the nozzle and is typically in the range from about 0 psig. to about 100 psig., preferably from about 0 psig. to about 20 psig. Once through the nozzle, the material to be dried is contacted for a relatively short time, e.g., from about 0.1 seconds to about 20 seconds with a gas stream which is at a temperature of from about 200° F. to about 1500° F., preferably from about 200° F. to about 750° F. The gas stream which may be, for example, air or the flue gases from an inline burner (used to provide a gas stream having the proper temperature) or a substantially oxygen-free gas, may flow co-current, counter-current or a combination of the two relative to the direction of flow of the material to be dried. The spray drying conditions, such as temperatures, pressures and the like, may be adjusted because, for example, of varying the composition of the material to be dried to obtain optimum results. However, this optimization may be achieved through routine experimentation.

An alternative to the high pressure nozzle described above is the "two-fluid" nozzle in which the material to be dried is dispersed by a stream of gas, typically air. The two fluid nozzle has the advantage of low operating pressure, e.g., from about 0 psig. to about 60 psig. for the material to be dried and from about 10 psig. to about 100 psig. for the dispersing gas. The dispersing gas may also function as at least a portion of the drying gas stream. The various operating parameters noted above may be varied in order to achieve the correct or desired bound particle size.

In order to minimize contact between the chamber walls and wet material, the chamber downstream from the nozzle system is large in size, e.g., from about 4 to about 30 feet in diameter and from about 7 to about 30 feet long, often with an additional conical shaped portion for convenient withdrawal of the dried material. The spray drying apparatus may also include separation means, e.g., cyclone separators, in the outlet gas line to recover at least a portion of the dried material entrained in this stream.

Suitable calcination temperatures for the precipitate are in the range of about 1000° F. to about 1800° F., for example about 1000° F. to about 1500° F. However, it has been found that improved spinel solid solution formation occurs when the calcination temperature is maintained within the range of about 1100° F. to about 1400° F., more preferably about 1150° F. to about 1350° F. and still more preferably about 1200° F. to about 1300° F. Calcination of the precipitate may take place in a period of time in the range of about 0.5 hours to about 24 hours or more, preferably in a period of time in the range of about 1 hour to about 10 hours. The calcination of the precipitate may occur at any suitable conditions, e.g., inert, reducing or oxidizing conditions, with oxidizing conditions being preferred.

In one embodiment of the process of this invention it has been discovered that spinel compositions having improved properties are afforded by impregnation procedures. Such preparative procedures preferably comprise the impregnation of at least one of certain additional metal components, noted previously, on the precipitate or the spinel composition.

In one preferred embodiment of this invention, calcination of the spinel composition after contacting with the additional metal component or components is effected at oxidizing conditions, e.g., in a stream of flowing air. These conditions are especially preferred when a cerium component is present in the formulation in order to prevent or minimize interaction between cerous ions and the spinel base.

A preferred alkali metal aluminate is sodium aluminate. Although the mineral acid may be nitric, hydrochloric, or sulfuric acid, the preferred alkaline earth metal salt is magnesium nitrate and the preferred mineral acid is nitric acid.

The process of this invention affords a precipitate phase which may be directly washed with water or, optionally, first permitted to age for up to about 24 hours at ambient temperature or elevated temperatures, prior to any further processing. Separation of the precipitate phase may be accomplished by any conventional means, such as filtration.

The products prepared by the process of this invention exhibit superior properties as sulfur oxide reduction materials, e.g., in fluid catalyst cracking operations, when compared with similar products prepared by other methods. For example, the products of this invention have suitable mechanical strength and bulk density, low attrition rate, suitable surface area and pore volume, and good fluidization characteristics.

The process of this invention provides spinel compositions exhibiting surface areas ranging from about 25 to about 600 m.$^2$/g.

The embodiments described below are exemplary, without limitation, of the process of this invention.

EXAMPLE I

An aqueous solution of magnesium nitrate was prepared by dissolving 769.2 g. (3.0 moles) of flaked magnesium nitrate hexahydrate in 1500 g. of deionized water.

An aqueous solution of sodium aluminate was made by dissolving 426.0 g. (1.83 moles $Na_2Al_2O_4$ and 0.49 moles NaOH) commercially available sodium aluminate and 21.7 g. (0.54 moles) sodium hydroxide pellets in 1500 g. deionized water. Any residue was removed by filtration through commercially available No. 1 filter paper.

The magnesium nitrate solution was added to a vessel containing 6000 g. deionized water. The sodium aluminate solution was then added to the same vessel with stirring over an hour period to a final pH of 9.5, and stirring was continued for another hour. The slurry was allowed to remain for about 16 hours to age the precipitate.

The slurry was then filtered and the solid cake washed with several portions of deionized water. The final cake was dried at 260° F. in a forced air drying oven for 16 hours. The dried product was ground in a laboratory mill until the fine material passed through a 60 mesh sieve. The ground material was then calcined in a stream of flowing air for 3 hours at 1350° F., following a 4 hour gradual heat-up to that temperature.

EXAMPLE II

An aqueous solution of magnesium nitrate was prepared by dissolving 769.2 g. (3.0 moles) flaked magnesium nitrate hexahydrate in 1500 g. deionized water. To this solution was added 205.9 g. (2.29 moles) concentrated nitric acid.

An aqueous solution of sodium aluminate was prepared by dissolving 629.1 g. (2.7 moles $Na_2Al_2O_4$ and 0.73 moles NaOH) commercially available sodium aluminate and 32.0 g. (0.8 moles) sodium hydroxide pellets in 1500 g. deionized water. The residue was removed by filtration through commercially available No. 1 filter paper.

The magnesium nitrate solution was added to a vessel containing 6000 g. deionized water. The sodium aluminate solution was then added to the vessel with stirring over a one hour period to a final pH of 9.5, and stirring was continued for an additional hour. The slurry was allowed to remain for about 16 hours to age the precipitate.

The slurry was filtered, washed, dried, and calcined as described in Example I.

EXAMPLE III

An aqueous solution of magnesium nitrate was prepared by dissolving 769.2 g. (3.0 moles) of flaked magnesium nitrate hexahydrate in 1500 g. of deionized water. To this was added 324.1 g. (3.6 moles) concentrated nitric acid.

An aqueous solution of sodium aluminate was made by dissolving 852 g. (3.66 moles $Na_2Al_2O_4$ and 0.983 moles NaOH) commercially available sodium aluminate in 2500 g. of deionized water. The residue was removed by filtration through commercially avaiable No. 1 filter paper.

The magnesium nitrate solution was added to a vessel containing 6000 g. deionized water. The sodium aluminate solution was added to the vessel with stirring over a period of one hour to a final pH of 9.5, and stirring was continued for another hour. The slurry was allowed to remain for about 16 hours to age the precipitate.

The slurry was then filtered, washed, dried, and calcined as described in Example I.

EXAMPLE IV

This Example, illustrative of a prior art process, is presented for comparative purposes to illustrate certain of the outstanding benefits of the present invention.

An aqueous solution of magnesium nitrate was prepared by dissolving 769.2 g. (3.0 moles) flaked magnesium nitrate hexahydrate in 1500 g. of deionized water. The resulting solution was heated to 170° F. on a hotplate.

An aqueous solution of sodium aluminate was prepared by dissolving 698.4 g. (3.0 moles $Na_2Al_2O_4$ and 0.806 moles NaOH) commercially available sodium aluminate and 152.4 g. (3.81 moles) of sodium hydroxide pellets in 1500 g. of deionized water. The residue was removed by filtration through commercially available No. 1 filter paper. The solution was then heated to 175° F. on a hotplate.

The hot magnesium nitrate solution was added to 5500 g. deionized water that had been heated to 170° F. The sodium aluminate solution was added gradually to the pot during a period of 15 minutes to a final pH of 11.1. Stirring was continued for 1 hour, and temperature was maintained at 170° F.

After the period of stirring, the slurry was cooled to 95° F., and the slurry was filtered. The cake was washed on the filter funnel with 12 kg. deionized water. The cake was then re-slurried with 600 g. of 10% w/w ammonium hydroxide solution at 175° F. The slurry was stirred for 30 minutes, then was cooled to 95° F., and filtered on a Buchner funnel. This wash cycle with ammonium hydroxide was repeated twice more. The final filter cake was then washed with 24 kg. of deionized water. The filter cake was dried at 300° F. for 16 hours. The dried material was ground in a laboratory mill until the fine material passed through a 60 mesh sieve. The ground material was then calcined at 1350° F. with flowing air for 3 hours.

The magnesium, aluminum-containing spinel products from Examples I-IV were characterized as shown in Table I. It will be seen that the products in Examples I, II, and III have the desirable property of being a single phase, e.g., a solid solution of either alumina or magnesia in magnesium aluminate spinel, while the product of Example IV is a physical mixture of magnesia and spinel. In addition the product yields for Examples I, II, and III are high, 97–99%, while the product yield from Example IV is low at 39%. The dried products from Examples I, II, and III are gelatinous solids that produce calcined materials that are harder and more attrition-resistant than the product from Example IV.

TABLE I

| Example | Wet Analysis Moles Al/Mg | Overall Composition Mole %[1] | XRD 440 Position (Degrees) | XRD Cal. Composition of Spinel-Containing Solid Solution Mole %[2] | N2 Area | Yield % |
| --- | --- | --- | --- | --- | --- | --- |
| I | 1.26 | 37% MgO 63% $MgAl_2O_4$ | 64.75 | 33% MgO 67% $MgAl_2O_4$ | 182 | 97 |
| II | 1.80 | 10% MgO 90% $MgAl_2O_4$ | 65.10 | 10% MgO 90% $MgAl_2O_4$ | 209 | 98 |
| III | 2.44 | 18% $Al_2O_3$ 82% $MgAl_2O_4$ | 65.45 | 14% $Al_2O_3$ 86% $MgAl_2O_4$ | 162 | 99 |
| IV | 1.01 | 50% MgO | 65.10[3] | 83% $MgAl_2O_4$ | 201 | 39 |

TABLE I-continued

| Example | Wet Analysis Moles Al/Mg | Overall Composition Mole %[1] | XRD 440 Position (Degrees) | XRD Cal. Composition of Spinel-Containing Solid Solution Mole %[2] | N2 Area | Yield % |
| --- | --- | --- | --- | --- | --- | --- |
|  |  | 50% MgAl$_2$O$_4$ |  | 17% MgO |  |  |

[1]assumes a mole of MgAl$_2$O$_4$ for 1 mole of MgO plus 1 mole Al$_2$O$_3$.
[2]stoichiometric spinel position is 65.23°; a calibration curve with X-ray diffraction (XRD) 440 reflection data for various MgO-rich and Al$_2$O$_3$ rich spinels was used to quantify the composition of the crystalline matter in these samples.
[3]free magnesia was detechted by XRD but not quantified.

While this invention has been described with respect to various specific examples and embodiments, it is to be understood that the invention is not limited thereto and that it can be variously practiced within the scope of the following claims:

The embodiments of this invention in which an exclusive property or privilege is claimed are defined as follows:

1. A process for the production of an alkaline earth metal, aluminum-containing spinel composition comprising:
   (a) adding a basic aqueous solution containing at least one aluminum component in which the aluminum is present as an anion to an aqueous solution containing at least one alkaline earth metal component and forming an alkaline earth metal, aluminum-containing precipitate, provided that the pH of the liquid phase present with said precipitate at the time said addition is concluded is in the range of about 8.5 to about 10.5; and
   (b) calcining said precipitate to form said alkaline earth metal, aluminum-containing spinel composition.

2. The process of claim 1 wherein the pH of the liquid phase present with said precipitate at the time said addition is concluded is in the range of about 9 to about 10.

3. The process of claim 1 wherein said aqueous solution containing at least one alkaline earth metal component includes at least one added acidic material.

4. The process of claim 3 wherein the pH of the liquid phase present with said precipitate at the time said addition is concluded is in the range of about 9 to about 10.

5. The process of claim 1 wherein the atomic ratio of alkaline earth metal to aluminum in said spinel composition is in the range of about 0.17 to about 1.

6. The process of claim 1 wherein the atomic ratio of alkaline earth metal to aluminum in said spinel composition is in the range of about 0.25 to about 0.75.

7. The process of claim 1 wherein the atomic ratio of alkaline earth metal to aluminum in said spinel composition is in the range of about 0.35 to about 0.65.

8. The process of claim 1 wherein said alkaline earth metal component is a magnesium component.

9. The process of claim 1 wherein said calcining takes place at a temperature in the range of about 1000° F. to about 1800° F.

10. The process of claim 1 wherein said calcining takes place at a temperature in the range of about 1100° F. to about 1400° F.

11. The process of claim 1 wherein said precipitate is dried to remove at least a portion of said liquid phase prior to being calcined.

12. The process of claim 1 which further comprises contacting said precipitate or said spinel compositions with at least one additional metal component to obtain a final spinel composition which includes a minor amount of at least one component of said additional metal in an amount effective to promote the oxidation of SO$_2$ to SO$_3$ at SO$_2$ oxidation conditions.

13. The process of claim 12 wherein said additional metal is selected from the group consisting of bismuth, rare earth metals, antimony, chromium, copper, iron, manganese, vanadium, tin and mixtures thereof.

14. The process of claim 1 wherein said alkaline earth metal component is magnesium nitrate and said aluminum component is alkali metal aluminate.

15. The process of claim 2 wherein said alkaline earth metal component is magnesium nitrate and said aluminum component is alkali metal aluminate.

16. The process of claim 4 wherein said alkaline earth metal component is magnesium nitrate and said aluminum component is alkali metal aluminate.

17. The process of claim 11 wherein said precipitate is spray dried and said spinel composition is in the form of particles having diameters in the range of about 10 to about 250 microns.

18. The process of claim 11 wherein said precipitate is maintained in contact with at least a portion of said liquid phase for a period of up to about 24 hours before being dried.

19. The process of claim 12 wherein said final spinel composition includes up to about 20% by weight, calculated as elemental metal, of at least one of said additional metal component.

20. The process of claim 13 wherein said spinel composition includes up to about 20% by weight, calculated as elemental metal, of a least one of said additional metal component.

* * * * *